Figure 1:
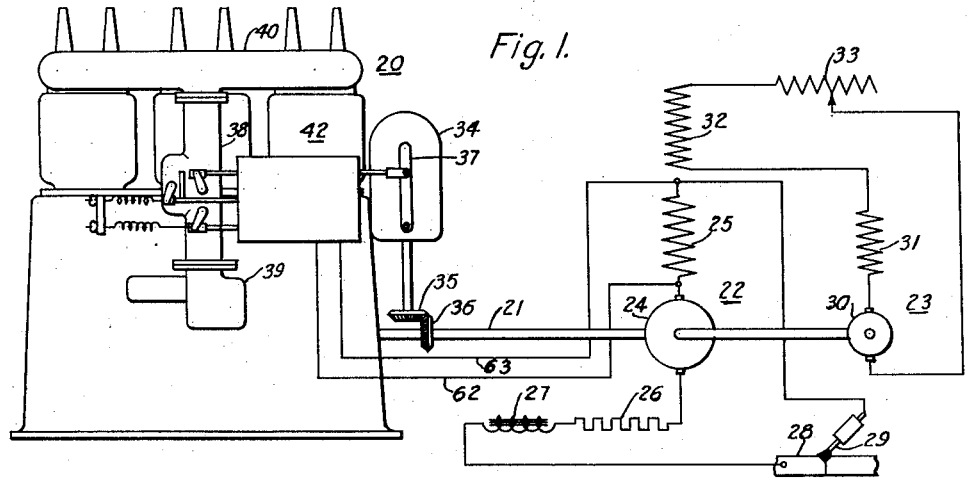

Feb. 12, 1935.  J. L. BROWN ET AL  1,991,078
SPEED CONTROL APPARATUS
Filed Dec. 21, 1932    5 Sheets-Sheet 1

WITNESSES:
Fred C. Witham
R R Lockwood

INVENTORS
John L. Brown &
John H. Blankenbuehler
BY
M. Crawford
ATTORNEY

Feb. 12, 1935.   J. L. BROWN ET AL   1,991,078
SPEED CONTROL APPARATUS
Filed Dec. 21, 1932    5 Sheets-Sheet 2

WITNESSES:

INVENTORS
John L. Brown &
John H. Blankenbuehler
BY
ATTORNEY

Feb. 12, 1935. J. L. BROWN ET AL 1,991,078
SPEED CONTROL APPARATUS
Filed Dec. 21, 1932    5 Sheets-Sheet 3

WITNESSES:
Fred C. Wilhelm
R R Lockwood

INVENTORS
John L. Brown &
John H. Blankenbuehler
BY
Crawford
ATTORNEY

Feb. 12, 1935.  J. L. BROWN ET AL  1,991,078
SPEED CONTROL APPARATUS
Filed Dec. 21, 1932   5 Sheets-Sheet 4
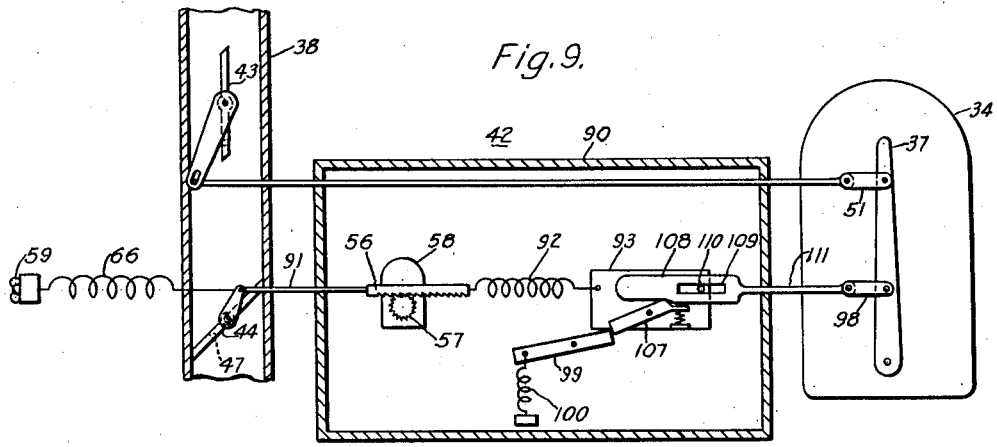
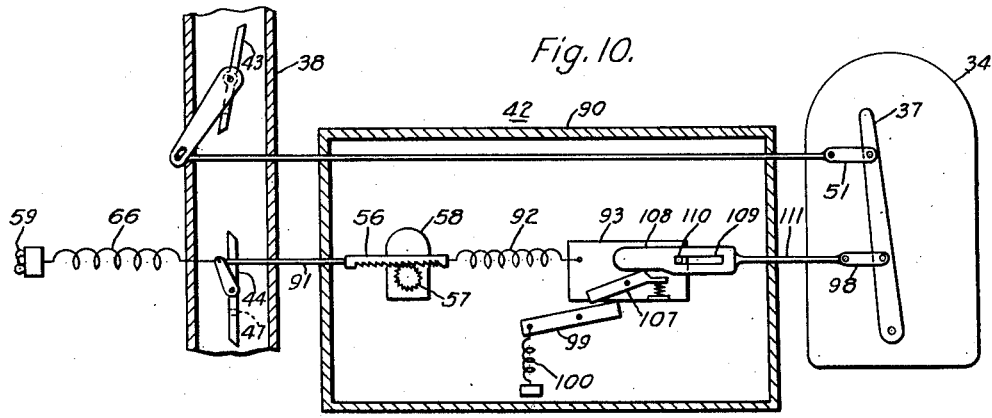
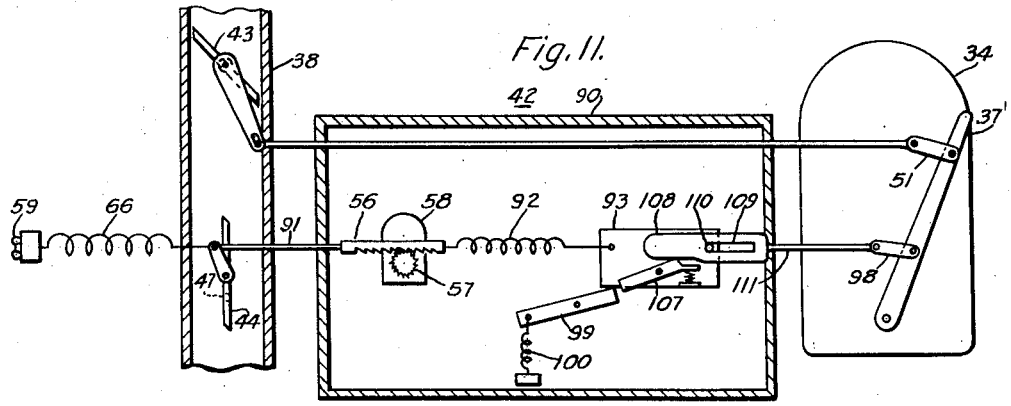
WITNESSES:
INVENTORS
John L. Brown &
John H. Blankenbuehler
BY
ATTORNEY Feb. 12, 1935. J. L. BROWN ET AL 1,991,078
SPEED CONTROL APPARATUS
Filed Dec. 21, 1932   5 Sheets-Sheet 5
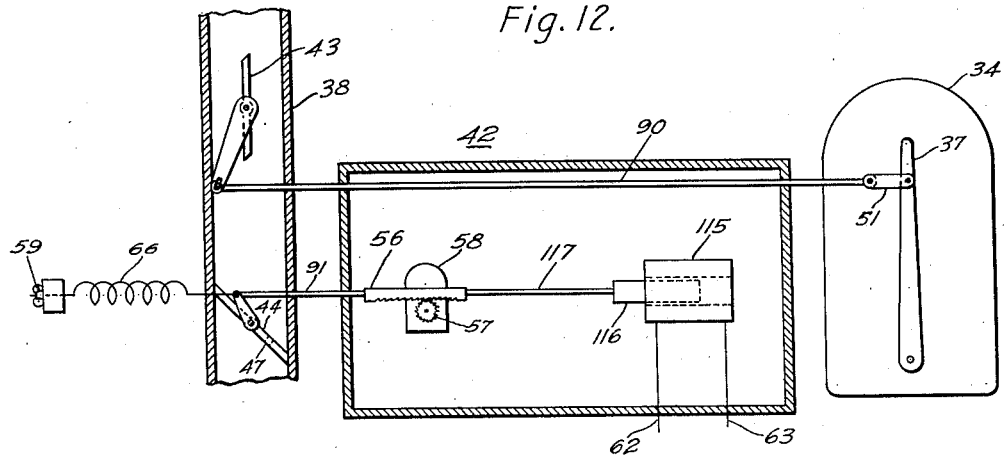
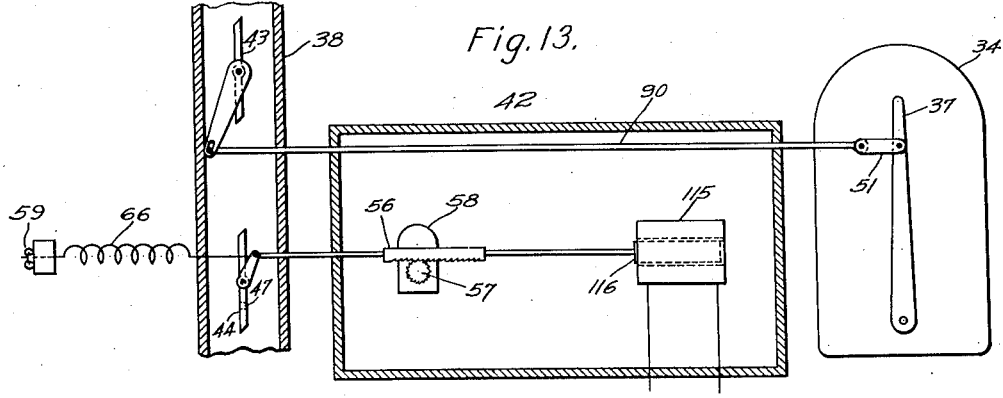
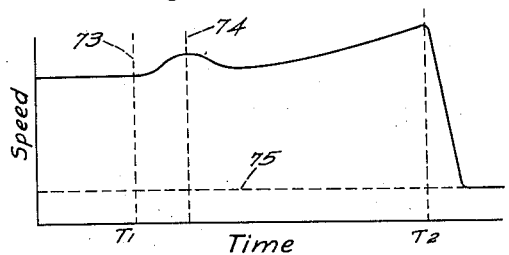
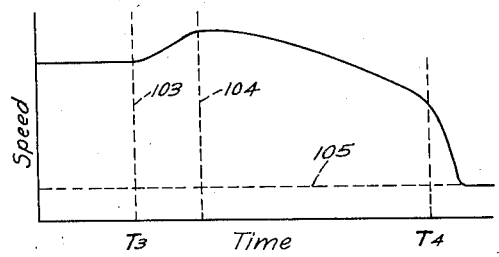
WITNESSES:
INVENTORS
John L. Brown &
John H. Blankenbuehler
BY
ATTORNEY Patented Feb. 12, 1935

1,991,078

UNITED STATES PATENT OFFICE 1,991,078

SPEED CONTROL APPARATUS

John L. Brown, Verona, and John H. Blankenbuehler, Edgewood, Pa., assignors to Westinghouse Electric & Manufacturing Company, East Pittsburgh, Pa., a corporation of Pennsylvania Application December 21, 1932, Serial No. 648,198

21 Claims. (Cl. 219—8)

Our invention relates, generally, to internal combustion engines and, more particularly, to apparatus for controlling the speed of internal combustion engines.

When an internal combustion engine is used for driving an arc welding generator, air compressor or the like, in which an intermittent load is applied to the engine because of the nature of the work generally performed by such apparatus, it is desirable to provide means for controlling the speed of the engine in accordance with the variation of the load. When the load is applied, it is desirable that the speed of the engine be increased from idling speed to full-load speed very rapidly.

When the load is removed, however, it is desirable to maintain the engine at full-speed for a definite time for the reason that the load may be reapplied within the definite time. In a system provided with a definite time delay for the shutting down of the engine, the rapid hunting from full-speed or operating speed to idling speed is avoided and full power is available for continuing operations at any instant within the time interval for which the apparatus is set.

The object of our invention, generally stated, is to provide speed control apparatus for an internal combustion engine which shall be simple and efficient in operation and which may be readily and economically manufactured and installed.

A more specific object of our invention is to provide for controlling the speed of an internal combustion engine in accordance with the characteristics of the load driven by the engine.

Another object of our invention is to provide for maintaining an internal combustion engine at full speed for a predetermined time after the load is removed from the engine.

Still another object of our invention is to provide for maintaining an internal combustion engine at full speed for a predetermined regulatable time after the load is removed from the engine.

Another object of our invention is to provide for utilizing a mechanical time-delay mechanism to prevent the decrease of the speed of an internal combustion engine for a predetermined time after the load is removed from the engine.

Still another object of our invention is to provide for regulating the speed of an internal combustion engine in a predetermined range of operating speed and to provide for maintaining the speed of the engine at the operating speed for a predetermined time after the load is removed from the engine.

A further object of our invention is to provide for raising the speed of an internal combustion engine from idling speed to full load speed on application of load to the engine by means of the governor used for controlling the speed of the engine in the operating range of speed.

A still further object of our invention is to provide for controlling the speed of an internal combustion engine connected to drive a welding generator by means of a governor and to provide independent means operable in accordance with the initiation and termination of flow of welding current for changing the speed of the engine from idling speed to operating speed and from operating speed to idling speed, together with means for preventing the change from operating speed to idling speed until after the expiration of a regulatable time interval after the termination of flow of welding current.

Other objects of our invention will in part be obvious and in part appear hereinafter.

Our invention, accordingly, is disclosed in the embodiment hereof shown in the accompanying drawings and comprises the features of construction, combination of elements, and arrangement of parts which will be exemplified in the construction hereinafter set forth and the scope of the application of which will be indicated in the appended claims.

Figure 2:
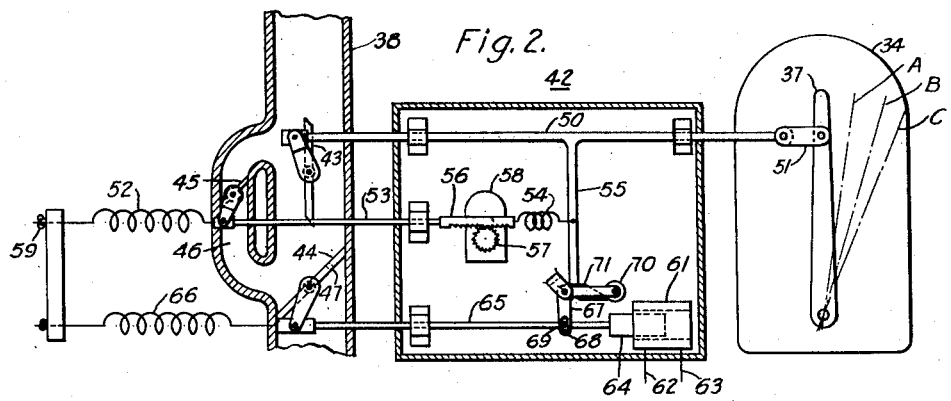
Figure 3:
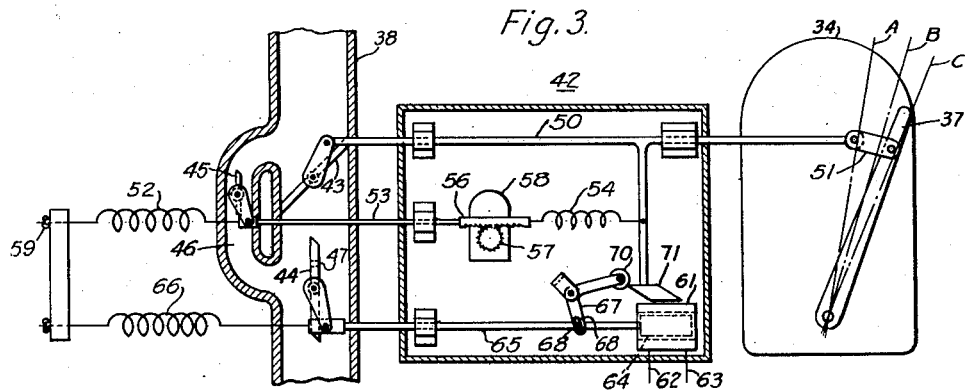
Figure 4:
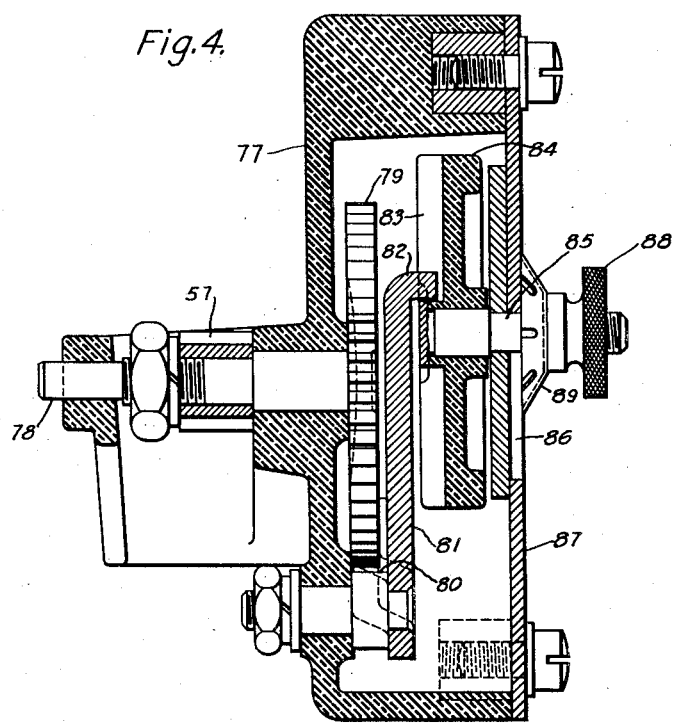
Figure 5:
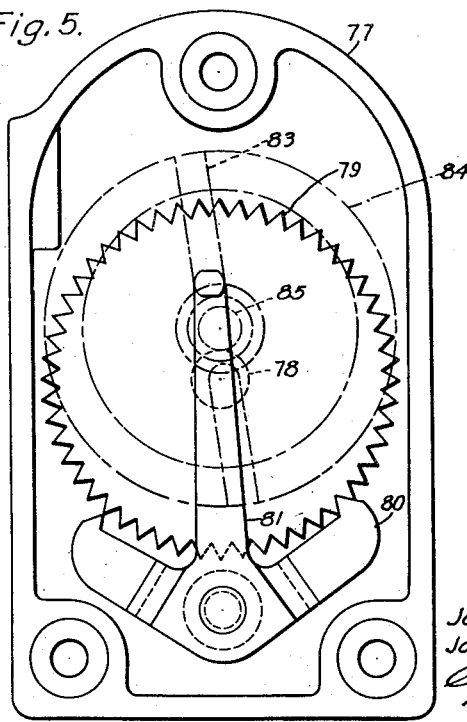
Figure 6:
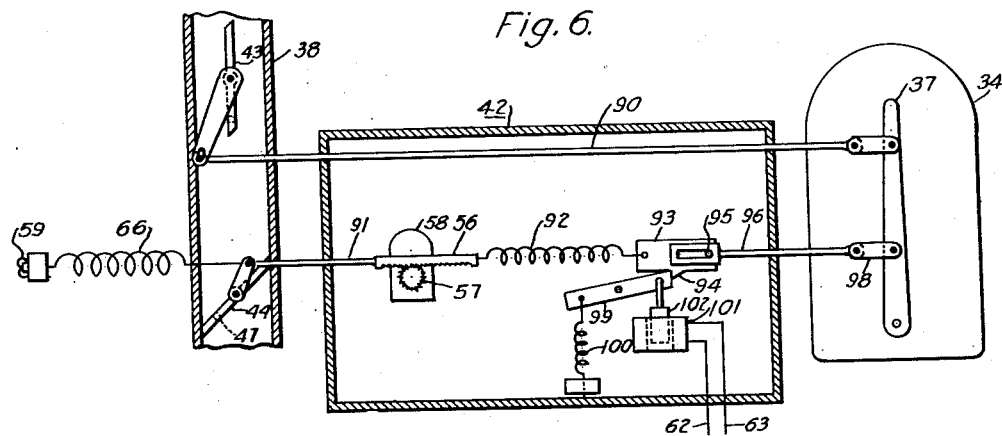
Figure 7:
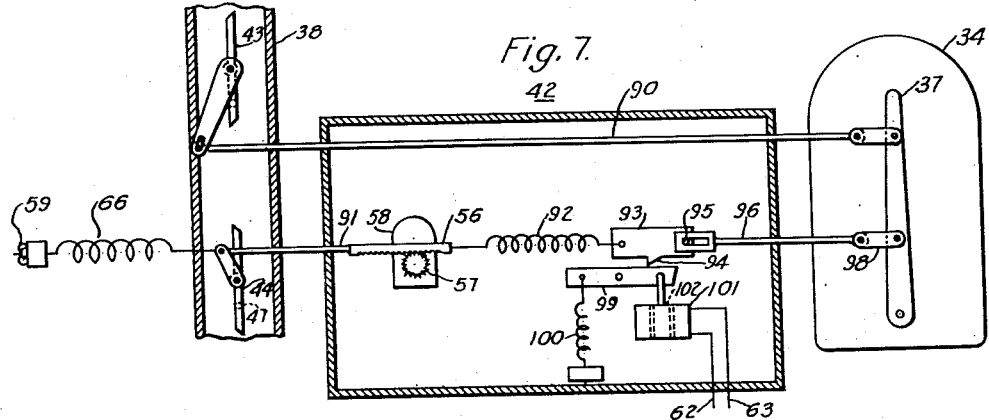
Figure 8:
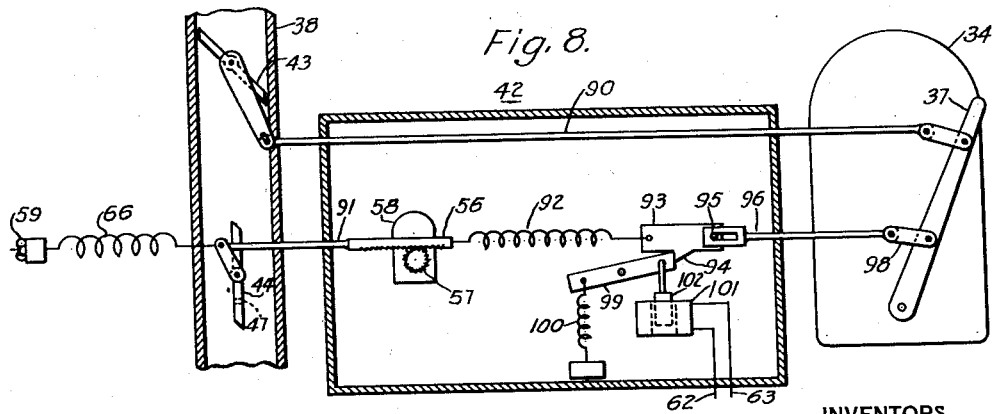

For a more complete understanding of the nature and scope of our invention reference may be had to the following detailed description taken in connection with the accompanying drawings, in which Figure 1 is a view in side elevation of an internal combustion engine connected to drive a welding generator, shown diagrammatically, in which the various modifications of our invention may be used for controlling the speed of the engine, Fig. 2 is a view partially in section, showing, at an enlarged scale, the speed controller illustrated in Fig. 1, Fig. 3 is a view of the speed controller illustrated in Fig. 2, showing the relative positions of the valves at a certain time in the cycle of operation, Fig. 4 is an enlarged sectional view of the timing device illustrated in Figs. 2 and 3, Fig. 5 is a front elevational view of the timing device illustrated in Fig. 4, the cover being removed to more clearly illustrate the construction, Figs. 6, 7 and 8 illustrate the various positions of a modification of the speed controller illustrated in Figs. 2 and 3, Figs. 9, 10 and 11 illustrate various operating positions of another modification of the speed controller illustrated in Figs. 2 and 3, Figs. 12 and 13 illustrate different operating positions of still another modification of the speed controller illustrated in Figs. 2 and 3, and Figs. 14 and 15 show curves which demonstrate the characteristics of the internal combustion engine, when controlled by the speed controllers illustrated in the drawings.

Referring now to Fig. 1 of the drawings, the apparatus there shown comprises an internal combustion engine illustrated generally at 20, which is connected by means of a drive shaft 21 to drive a welding generator 22 and an exciter 23. The internal combustion engine 20 may be of any suitable type and it may be connected to drive any other type of load such as an air compressor or the like. However, in this specification the description of the apparatus will be confined to an internal combustion engine connected to drive a welding generator, but it will be readily understood that the invention may be practiced in connection with internal combustion engines connected to drive various other types of loads.

The welding generator 22 comprises an armature 24 and a series field winding 25 which are connected to supply current to a welding circuit that comprises a resistor 26 and an inductor 27 connected in the customary manner to work 28, on which a welding operation is to be performed, and an electrode 29 which is used for maintaining the arc, as will be readily understood by those skilled in the art.

The exciter 23 is provided with an armature 30 and a series field winding 31 which are connected to supply exciting current to a main field winding 32 of the generator 22 and connected to supply a field flux which is opposed to the flux generated by the series field winding 25. A variable resistor 33 is provided for regulating the amount of exciting current supplied to the main field winding 32.

In order to regulate the speed of the engine within a predetermined range of operating speed, so that the generator 22 may be operated at a substantially constant speed while the welding operation is being performed, a governor 34 is connected by means of bevel gears 35 and 36 to the drive shaft 21, as illustrated. The governor 34 may be of any suitable type, well known in the art, which is provided with an operating element such as a lever 37 that is movable in accordance with the speed of the shaft 21 which is proportional to the speed of the engine 20, to regulate the position of a valve in an inlet pipe 38 connecting a carburetor 39 with the intake manifold 40 of the engine 20. Since any suitable type of governor may be used for controlling the speed of the engine in the operating range, it has been deemed unnecessary to set forth a detailed description thereof in this specification.

As set forth hereinbefore, it is desirable to maintain the speed of the engine 20 at the operating speed for a predetermined time after the load is removed from the engine or, in this instance, for a predetermined time after the welding electrode 29 has been removed from arcing engagement with the work 28 and the current in the welding circuit has, therefore, ceased to flow. In order to provide for the desired time delay in the operation of the engine 20, a speed controller, shown generally at 42, is provided which is illustrated more clearly in Figs. 2 and 3 of the drawings.

Referring now to Fig. 2 of the drawings, it will be observed that the inlet pipe 38 is provided with a first control valve 43 and a second control valve 44, together with an auxiliary control valve 45 which is disposed in a passage 46 that is arranged to by-pass the first control valve 43 when it is in the closed position. It will also be observed that a bleeder opening 47 is provided in the second control valve 44, so that sufficient fuel may be admitted to the engine when it is in the closed position to maintain the engine in operation at idling speed.

The governor 34 is arranged to control the operation of the first control valve 43 in the customary manner, so that the speed of the engine may be maintained at the speed for which the governor 34 is set or adjusted. A connection between the lever 37 and the first control valve 43 is provided by means of a connecting rod 50 and a suitable link 51, as illustrated.

It will be observed that the auxiliary valve 45 is provided with a tension spring 52 which serves to bias it to the closed position. In order to open the auxiliary valve 45, when the welding operation has been terminated, to slow the engine down to idling speed, the auxiliary valve 45 is connected to be operated in accordance with the movement of the lever 37 through the agency of a connecting rod 53 and a tension spring 54 which are connected to a depending arm 55 from the connecting rod 50.

In order to delay the opening of the auxiliary valve 45 until after the expiration of a predetermined time, the connecting rod 53 is provided with a rack 56 having angularly disposed teeth that are arranged to engage corresponding teeth on a ratchet wheel 57 of a time-delay mechanism 58, a description of which will be set forth hereinafter. The time-delay mechanism 58 is arranged to prevent the opening of the auxiliary valve 45 until after the expiration of a predetermined time interval, but the rack 56 is so disposed with respect to the ratchet wheel 57 that the auxiliary valve 45 is closed very rapidly under the influence of the tension spring 52 when the lever 37 is returned to the position illustrated in Fig. 2 of the drawings.

Because of the tension of the spring 52, it will be apparent that the depending arm 55 may be moved to the right, as viewed in Fig. 2, to a certain point before the auxiliary valve 45 will be urged to the open position. This range of movement permits the governor 34 to control the operation of the first control valve 43 over the range of operating speed without initiating the operation of the auxiliary valve 45 within this range of speed. In order to adjust the point at which the auxiliary valve 45 will be opened an adjusting nut 59 is provided for varying the tension of the spring 52.

In order to effect the operation of the second control valve 44 to the open position, a solenoid 61 is provided which may be connected by means of conductors 62 and 63 to the terminals of the series field winding 25. The solenoid 61 is provided with an armature 64 that is coupled to a connecting rod 65 which is attached, as illustrated, to the second control valve 44. In order to bias the second control valve 44 to the closed position, a tension spring 66 is provided, as shown. While the solenoid 61 is illustrated as being connected across the terminals of the series field winding, it will be readily apparent that there are various other ways in which it may be connected to the welding circuit or to the welding generator 22, so that it may be responsive to the initiation and termination of the flow of welding current.

After the welding operation has been initiated, it is desirable to prevent the closure of the second control valve 44 so that the desired time delay in the change from operating speed to idling speed may be obtained. In order to maintain the second control valve 44 in the open position until after the expiration of a predetermined time for which the timing mechanism 58 is set, a pivotally-mounted operating lever 67 is provided having a slotted opening 68 for engaging a suitable pin 69 on the connecting rod 65. The operating lever 67 is provided at its other end with a roller 70 which is disposed to engage a cam 71 carried by the lever 55.

It will be observed that on energization of the solenoid 61, the armature 64 will be moved to the position illustrated in Fig. 3 of the drawings and that the roller 70 will be moved upwardly. The roller 70 is so disposed with respect to the cam 71 that a slight movement of the lever 37 of the governor 34 to the right within the operating range of the governor, will cause the cam 71 to move underneath the roller 70 so that it is prevented from resuming the position illustrated in Fig. 2 until after the cam 71 has passed completely underneath it. When the roller 70 is maintained in the raised position, it will be apparent that the second control valve 44 will be prevented from closing. However, after the cam 71 has completely passed from underneath the roller 70, it will resume the idling speed position and the second control valve 44 will be immediately closed.

In order to describe the functioning and operation of the speed controller 42, reference may be had to the curve illustrated in Fig. 14. This curve is plotted with time as abscissa and the speed of the engine as ordinates. The condition or normal operating speed of the engine 20 is illustrated by the flat portion of the curve to the left of the ordinate 73. This part of the curve represents the speed of the engine while the welding operation is being performed and it is maintained at this speed by means of the governor 34 in the customary manner.

During the normal operation of the system, while the welding operation is being performed, the lever 37 is disposed at some position indicated by either of the dotted lines A or B in Fig. 2. Because of the flow of current through the series field winding 25, the solenoid 61 is energized and the second control valve 44 is in the open position. The roller 70 is, therefore, above the cam 71 and will be prevented from being moved downwardly to permit the closure of the second control valve 44 until the lever 37 is in a position which may be represented by the dotted line C.

Assuming now that the welding operation is stopped at the time represented by $T_1$ in Fig. 14, the load is immediately removed from the engine 20 and it tends to raise its speed due to the decrease in load. This increase in speed is represented by the hump in the curve, illustrated in Fig. 14, and continues until it intersects the ordinate 74 at which time the lever 37 is moved further to the right to effect the closure of the first control valve 43. However, the governor 34 is only capable of maintaining the speed of the engine at substantially the operating speed and, therefore, it cannot be used to reduce the speed of the engine to the idling speed.

Upon the termination of the welding operation, it is necessary for the lever 37 of the governor 34 to move to some position outside of its normal range of operating positions in an attempt to reduce the speed of the engine to the value for which the governor is set. On movement of the lever 37 outside of this predetermined range of movement, the effect of the spring 52 is overcome and the resultant force is applied to the connecting rod 53 to actuate auxiliary control valve 45 to the open position. However, the time of opening of the auxiliary control valve 45 is delayed because of the timing mechanism 58, so that it is only actuated to the full open position after the expiration of the time for which the timing mechanism 58 is adjusted.

Because of the gradual opening of the auxiliary control valve 45, the speed of the engine is gradually increased while at the same time the first control valve 43 is moved to the position illustrated in Fig. 3 of the drawings. The curve illustrated in Fig. 14, shows the gradual increase in speed until a time $T_2$. When the lever 37 is in a position indicated by the dotted line C, in an attempt by the governor 34 to counteract the increase in speed caused by the opening of the auxiliary control valve 45, the condition of the speed control apparatus just prior to the time $T_2$ is as illustrated in Fig. 3 of the drawings. It will be observed that the cam 71 has nearly passed from underneath the roller 70 which, in the upward position, has maintained the second control valve 44 in the open position despite the de-energization of the solenoid 61. At the time $T_2$, when the lever 37 is in the position indicated by the dotted line C, the roller 70 moves downwardly and the second control valve 44 is immediately closed by the action of the tension spring 66.

Since the second control valve 44 is now completely closed and permits only a small amount of fuel to flow through the bleeder opening 47, the speed of the engine is reduced to idling speed, which is represented by the abscissa 75 on the curve illustrated in Fig. 14. Since the speed of the engine is reduced to a comparatively low value, the governor 34, in an attempt to raise this speed to the normal operating speed, is returned to the position illustrated in Fig. 2 of the drawings which shows the condition of the speed controller during the idling period.

In the event that current is caused to flow in the welding circuit between the times indicated by $T_1$ and $T_2$, the solenoid 61 is again energized. However, since the cam 71 is still underneath the roller 70, the re-energization of the solenoid 61 has no effect on the operation of the system. The application of load to the engine, however, will immediately reduce the speed thereof causing the governor 34 to actuate the lever 37 in a direction opposite to its previous movement, so that the first control valve 43 is moved to the open position to provide sufficient fuel for the increase in load. The movement of the lever 37 back to the normal operating range removes the tension which had been previously applied to the spring 54, thereby allowing the tension spring 52 to actuate the auxiliary control valve to the closed position.

In view of the foregoing, it will be apparent that at any time up until the time $T_2$ when the current is caused to flow in the welding circuit, the speed of the engine will be maintained, at least, as high as the operating speed and generally at some speed above this operating speed. Therefore, a relatively high voltage will always be obtainable between the welding electrode 29 and the work 28 for restarting the welding arc during this period. However, if the interval between the times $T_1$ and $T_2$ is allowed to elapse without the initiation of the welding operation, the engine 20 is caused to operate at the idling speed, as has been set forth hereinbefore, until it is again desired to perform the welding operation.

Referring now to Figs. 4 and 5 of the drawings, a time delay mechanism is shown which is suitable for introducing a time delay in the action of the auxiliary control valve 45. While the time delay mechanism, illustrated in Figs. 4 and 5 of the drawings, constitutes no part of this invention, a description thereof will be given in order to clearly illustrate the manner in which a mechanical time delay apparatus may be used to perform the desired function. It will be readily understood that any other suitable time delay mechanism may be used in lieu of that shown and described herein.

The time delay mechanism illustrated comprises a frame 77 in which a shaft 78 is suitably mounted. The shaft 78 is provided with the ratchet wheel 57 which is illustrated in Figs. 2 and 3 of the drawings and which is disposed to engage the rack 56 as set forth hereinbefore, so that while the ratchet wheel 57 serves to oppose the movement of the rack 56 in one direction, it offers no opposition to the movement thereto in the opposite direction.

On the inner end of the shaft 78, a ratchet wheel 79 is mounted which is disposed to be engaged by means of a pawl 80. The pawl 80 is provided with an upwardly extending arm 81 having an outwardly extending projection 82 at the upper end thereof which is disposed to engage a slot 83 in a balance wheel 84. As illustrated, the balance wheel 84 is mounted for oscillation on a shaft 85, which in turn, may be moved in a slot 86 located in the cover 87. The shaft 85 is secured, in any desired position, along the slot 86 by means of a nut 88 and a spring washer 89.

In operation, the rotation of the ratchet wheel 79 causes the pawl 80 to oscillate back-and-forth about its pivot point. However, the rate of oscillation of the pawl 80 is governed by the balance wheel 84, since for each oscillation of the pawl 80, it is necessary, at the same time, to oscillate the balance wheel 84. Because of the inertia of the balance wheel 84, a certain amount of governor action is applied to the pawl 80 and is thereby transmitted to the ratchet wheel 79 retarding the rotation thereof.

In the position illustrated in the drawings, the balance wheel 84 is disposed to introduce the maximum time delay in the operation of the ratchet wheel 79. If it is desired to reduce the time delay, the nut 88 is loosened and the balance wheel 84 is moved downwardly, so that the projection 82, at the upper end of the arm 81, is caused to engage the slot 83 of the balance wheel 84 at a higher position where the inertia of the balance wheel 84 will be less effective to retard the movement of the pawl 80.

With a timing device similar to that illustrated in Figs. 4 and 5 of the drawings, it will be readily apparent that it is possible to obtain any desired time delay in the action of the auxiliary valve 45, so that the time interval between the times $T_1$ and $T_2$ may be varied over a wide range.

Referring now to Figs. 6, 7 and 8 of the drawings, a modification of the speed controller 42, described hereinbefore, is illustrated. In this modification of the speed controller, the auxiliary valve 45 and the passageway 46 are eliminated and the lever 37 of the governor 34 is connected directly to the first control valve 43 in the intake pipe 38 by means of a connecting rod 90. The rack 56 of the timing device 58 is connected directly to the second control valve 44 by means of a connecting rod 91. The lever 37 is also flexibly coupled to the second control valve 44 through the agency of a tension spring 92 and a sliding connection comprising a bar 93, having a downwardly extending tooth 94 and a pin 95 with which the slotted end coupling of a connecting rod 96 is disposed to engage.

As illustrated, the connecting rod 96 is connected to the lever 37 by means of a suitable link 98. In order to hold the bar 93 in the position illustrated in Fig. 6 of the drawings, a pivoted latch 99 is provided which is biased into engagement with the bar 93 by means of a tension spring 100. In order to release the bar 93 and thereby permit the second control valve 44 to be moved to the open position under the influence of the spring 66, a solenoid 101 is provided having an armature 102 which is connected, as illustrated, to the latch 99. The solenoid 101 may be connected to the series field winding 25 of the generator 22 by means of the conductors 62 and 63.

While the engine 20 is operating at the idling speed and the welding operation is not being performed, the condition of the speed controller 42 is, as illustrated in Fig. 6 of the drawings. It will be observed that the position of the lever 37 is such as to permit the full opening of the first control valve 43, because of the inherent tendency of the governor 34 to attempt to maintain the operating speed for which it is set. Since the second control valve 44 is in the closed position, only a sufficient amount of fuel is permitted to flow through the bleeder opening 47, as to permit the operation of the engine 20 at the idling speed.

At the initiation of the welding operation, the solenoid 101 is energized thereby moving the armature 102 downwardly to trip the latch 99 so that the second control valve 44 is free to move to the open position under the control of the spring 66. Because of the ratchet effect between the rack 56 and the ratchet wheel 57, a movement of the second control valve 44 to the open position occurs almost immediately. The governor 34 then assumes control of the engine and maintains it at the desired operating speed by actuating the first control valve 43 in accordance with the load which is applied by the welding generator. The relative position of the elements of the speed controller 42 are illustrated in Fig. 7 which shows their position at the time that the solenoid 101 has been energized.

In the event that the welding operation is terminated, the speed of the engine immediately tends to rise because of this decrease in load. As set forth hereinbefore, the governor 34 attempts to maintain the operating speed and, therefore, it moves to the position illustrated in Fig. 8 of the drawings to effect the closure of the first control valve 43. Since the effect of the governor is to maintain only the operating speed, it is not capable of closing the first control valve 43 to such an extent that the speed will be reduced to the desired idling speed.

The movement of the lever 37 to the position illustrated in Fig. 8 of the drawings causes a sufficient tension to be applied to the spring 92 that it is capable of overcoming the force exerted by the spring 66 and, therefore, it initiates the movement of the second control valve 44 to the closed position. However, because of the time delay introduced by the timing mechanism 58, the second control valve 44 is only closed at the expiration of the time interval for which the timing mechanism 58 is adjusted or set.

It will be observed that the continued movement of the lever 37 causes the latch 99 to again engage the tooth 94 so that, even though the lever 37 is moved back to the position illustrated in Fig. 6 of the drawings, the tension will still be applied to the spring 92 to effect the closure of the second control valve 44 to the idling position.

The operation of the speed controller illustrated in Figs. 6, 7 and 8 of the drawings may be better understood by reference to the curve illustrated in Fig. 15 in which, as before, the abscissae represent time and the ordinates represent the speed of the engine. Up to the time represented by $T_3$ and as indicated by the curve to the left of the ordinate 103, the engine 20 is driving the welding generator 22 under normal working conditions. At the time $T_3$, the welding operation is interrupted and the speed of the engine rises to a point which may be represented by the intersection of the curve with the ordinate 104. During this interval of time, the governor 34 is attempting to reduce the speed of the engine by closing the first control valve 43. However, due to the removal of load from the engine, the closure of the first control valve 43 has a very slight effect on the speed of the engine and further, as set forth hereinbefore, the limit of operation of the governor 34 is to maintain the speed of the engine at the normal operating speed. The lever 37 will assume the position illustrated in Fig. 8 of the drawings so that sufficient tension is applied to the spring 92 to initiate the closure of the second control valve 44, which on being closed causes the speed of the engine to be reduced slightly until the time indicated by $T_4$ when the second control valve 44 is completely closed and the speed drops to the idling speed which may be represented by the abscissa 105.

In the event that it is desired to initiate the welding operation between the times $T_3$ and $T_4$, as represented in Fig. 15, the solenoid 101 is again energized because of the flow of current in the welding circuit and the latch 99 is tripped to permit the movement of the second control valve 44 to the full open position.

Referring now to Figs. 9, 10 and 11, a further modification of the speed controller 42 is there illustrated. The speed controller illustrated in Figs. 9, 10 and 11 is similar to that illustrated in Figs. 6, 7 and 8, except that there is no electrical connection to the welding circuit. Instead of the second control valve 44 being released for movement to the open position through the actuation of an electro-responsive device which is connected to the welding circuit, the governor 34 itself is arranged to perform this function.

As illustrated in the drawings, the bar 93 is provided with a spring pressed trigger 107 which is pivotally mounted thereon and is arranged to engage the latch 99, that is urged into engagement therewith by means of the spring 100. In order to release the latch 99, the trigger 107 may be moved out of engagement therewith by means of a link 108 having on its underside a cam surface which, as shown, is arranged to engage the trigger 107. The link 108 is provided with a slotted opening 109 which is arranged to engage a pin 110 located in the bar 93. The link 108 is connected, as illustrated, to the lever 37 by means of a connecting rod 111 and the link 98.

While the engine 20 is operating at the idling speed and the welding operation is not being performed, the condition of the speed controller 42 is, as illustrated, in Fig. 9. On application of welding load to the generator and thereby load to the engine 20, the governor 34 attempts to increase the speed of the engine to compensate for the added load and, therefore, the lever 37 is moved to the position illustrated in Fig. 10 of the drawings. This movement of the lever 37 causes the link 108 to be moved to the left so that the trigger 107 is rotated out of engagement with the latch 99 and immediately the second control valve 44 is actuated to the open position by means of the spring 66. The governor 34 then is restored to control the operation of the engine 20 and by moving the first control valve 43 it maintains the speed of the engine at the desired operating speed.

At the termination of the welding operation, the load is removed from the engine 20 and, as set forth hereinbefore, its speed rises. In order to compensate for this rise in speed, the governor 34 moves the lever 37 to the position illustrated in Fig. 11 of the drawings and carries with it the bar 93, so that the trigger 107 is again placed in the path of the latch 99. Sufficient force is then exerted upon the spring 92 to overcome the force of the spring 66 and the movement of the second control valve 44 to the closed position is initiated. However, because of the time delay mechanism 58, the closure of the second control valve 44 will be delayed until time has elapsed for which the timing mechanism 58 is set, as has been described hereinbefore.

The curve illustrated in Fig. 15 of the drawings shows graphically the operation of the speed controller 42, illustrated in Figs. 9, 10 and 11. In the event that the welding operation is resumed during the time interval between $T_3$ and $T_4$, the latch 99 will be tripped again, the second control valve will be released to the full open position, and the governor 34 will then be permitted to control the speed of the engine in the ordinary manner.

Referring now to Figs. 12 and 13 of the drawings, a further modification of the speed controller 42 is there illustrated, which is similar to the speed controller illustrated in Figs. 6, 7 and 8, except that the governor 34 is arranged to control only the operation of the first control valve 43. As illustrated in Fig. 12 of the drawings, the governor 34 is connected to control the operation of the first control valve 43 through the agency of the connecting rod 90, link 51 and lever 37. In this modification of the invention, the governor 34 serves no other purpose than to control the operation of the first control valve 43.

In order to actuate the second control valve 44 to the open position, a solenoid 115 is provided which may be connected by means of conductors 62 and 63 to the series fielding winding 25 of the generator 22. The solenoid 115 is provided with an armature 116 which may be connected by means of a connecting rod 117 to the rack 56 which is disposed to engage the ratchet wheel 57 of the time delay mechanism 58. In this instance, the spring 66 serves to bias the second control valve 44 to the closed position. It will also be observed that the relative shape of the teeth of the rack 56 and the pinion 57 have been reversed from their shape, as shown in the previous figures.

The condition of the apparatus in the speed controller 42 while the engine is idling and the welding operation is not being performed, as illustrated in Fig. 12 of the drawings. It will be observed that the first control valve 43 is in the full open position because of the inherent characteristic of the governor to tend to maintain the speed of the engine at the operating speed. However, the speed of the engine is maintained at the idling speed, because the second control valve 44 is in the closed position, as illustrated, and only sufficient fuel is permitted to flow through the bleeder opening 47 to maintain the engine at the idling speed.

On initiation of the welding operation, the solenoid 115 is energized thereby actuating the second control valve 44 to the open postion, as illustrated in Fig. 13 of the drawings. The condition of the apparatus will be maintained, as illustrated in Fig. 13 except that the first control valve 43 will be moved to a position by means of the governor 34 such that the operating speed of the engine will be maintained at the value for which the governor is set.

In the event that the welding operation is terminated the solenoid 115 is immediately de-energized and the spring 66 serves to initiate the movement of the second control valve 44 to the closed position. However, the control valve 44 is prevented from immediately assuming the full closed position because of the time delay mechanism 58 which, as set forth hereinbefore, is operable only at a predetermined rate of speed.

The curve illustrated in Fig. 15 of the drawings shows the operating characteristic of the engine 20 when subjected to the control of the speed controller illustrated in Figs. 12 and 13. In the event that the welding operation is resumed during the time interval between T₃ and T₄, the solenoid 115 will again be energized and, due to the ratchet relation between the rack 56 and the ratchet wheel 57, the second control valve 44 will be immediately actuated to the open position.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

We claim as our invention:

1. Speed control apparatus for an internal combustion engine comprising, in combination, a first and a second control valve disposed in a fuel inlet pipe to the engine, means having driving connection with the engine and operable in accordance with the speed thereof connected to the first control valve for regulating the speed of the engine in a predetermined range of operating speed, coupling means connecting the speed responsive means to the second control valve to effect the closure thereof when the engine exceeds the range of operating speed, timing means operatively connected to the second control valve to prevent the closure thereof before the expiration of a predetermined time interval, retaining means connected to the second control valve to secure it in the closed position, and means operable on application of load to the engine for tripping the retaining means to release the second control valve for movement to the open position.

2. Speed control apparatus for an internal combustion engine connected to drive an electric generator for supplying current to a welding circuit comprising, in combination, a first and a second control valve disposed in a fuel inlet pipe to the engine, a governor having driving connection with the engine and operatively connected to the first control valve for regulating the speed of the engine within a predetermined range of operating speed, control means operatively connected to the second control valve and responsive to termination of the flow of current in the welding circuit for initiating the movement of the second control valve to the closed position, mechanical timing means operatively connected to the second control valve for preventing the closure thereof until the expiration of a regulatable time interval after the termination of flow of current in the welding circuit, and additional control means operatively connected to the second control valve for effecting the movement thereof to the open position substantially instantaneously after the initiation of current flow in the welding circuit.

3. Apparatus for controlling the flow of fuel to an internal combustion engine comprising, in combination, a first and a second control valve located in tandem in a fuel inlet pipe to the engine, an auxiliary valve located in a passage by-passing the first control valve, a governor having driving connection with the engine and means movable in accordance with the speed thereof, means for operatively connecting the speed responsive means to the first control valve for regulating the flow of fuel and thereby the speed of the engine to maintain a predetermined operating speed, means for operatively connecting the speed responsive means to the auxiliary valve to effect the opening thereof as the first control valve is closed, timing means operatively connected to the last named connecting means to prevent the opening of the auxiliary valve until the expiration of a predetermined time interval after the movement of the auxiliary valve is initiated, load responsive means operatively connected to the second control valve for effecting the opening thereof on application of load to the engine, and means connecting the speed responsive means and the second control valve to prevent the closure of the latter until the speed of the engine is at a predetermined value.

4. Apparatus for controlling the speed of an internal combustion engine comprising, in combination, a fuel intake pipe connecting the carburetor and intake manifold of the engine, a first and a second control valve in the intake pipe for controlling the flow of fuel therethrough, an auxiliary valve for controlling the flow of fuel in a passage by-passing the first control valve, a governor operable in accordance with the speed of the engine and having connection with the first control valve for controlling the speed of the engine, means for connecting the auxiliary valve to the governor to effect the opening thereof as the first control valve is closed, timing means connected to the auxiliary valve for causing the opening thereof only after a predetermined time interval, load responsive means connected to the second control valve for effecting the opening thereof on application of load to the engine, and means operable in accordance with the operation of the governor for maintaining the second control valve in the open position until the engine is operating at a predetermined speed.

5. Apparatus for controlling the speed of an internal combustion engine comprising, in combination, a fuel intake pipe connecting the carburetor and intake manifold of the engine, a first and a second control valve in the intake pipe for controlling the flow of fuel therethrough, an auxiliary valve for controlling the flow of fuel in a passage by-passing the first control valve, a governor operable in accordance with the speed of the engine and having connection with the first control valve for controlling the speed of the engine, means for connecting the auxiliary valve to the governor to effect the opening thereof after the first control valve is closed to a predetermined position, adjustable timing means connected to the auxiliary valve for effecting the opening thereof after a predetermined interval, load responsive means connected to the second valve for effecting the opening thereof on application of load to the engine, and means operable in accordance with the operation of the governor for maintaining the second control valve in the open position until the engine is operating at a predetermined speed.

6. Apparatus for controlling the speed of an internal combustion engine connected to drive an electric generator for supplying current to a welding circuit, comprising, in combination, a first and a second control valve disposed in a fuel inlet pipe for regulating the flow of fuel to the engine, an auxiliary valve disposed in a passage by-passing the first control valve, a governor provided with a lever operable in accordance with the speed of the engine, means for connecting the lever to the first control valve and for resiliently connecting said lever to the auxiliary control valve to effect the opening of the latter valve after the former valve is closed to a predetermined position, timing means connected to the auxiliary valve for preventing the opening thereof for a predetermined interval, electro-responsive means connected to the welding circuit and disposed to be energized on flow of welding current, means for connecting the electro-responsive means to the second control valve for effecting the opening thereof on flow of welding current, and means operable in accordance with the movement of the governor lever for maintaining the second control valve in the open position until the engine is operating at a predetermined speed.

7. Apparatus for controlling the speed of an internal combustion engine connected to drive an electric generator for supplying current to a welding circuit comprising, in combination, a first and a second control valve disposed in a fuel inlet pipe to the engine, means having driving connection with the engine and operable in accordance with the speed thereof connected to the first control valve for regulating the speed of the engine in a predetermined range of operating speed, coupling means connecting the speed responsive means to the second control valve to effect the closure thereof when the engine exceeds the range of operating speed, timing means operatively connected to the second control valve to prevent the closure thereof before the expiration of a predeterminable time interval, and control means operatively associated with the second control valve and connected to the welding circuit for maintaining the second control valve closed until current flows in the welding circuit.

8. Apparatus for controlling the speed of an internal combustion engine connected to drive an electric generator for supplying current to a welding circuit comprising, in combination, a first and a second control valve disposed in tandem in a fuel inlet pipe to the engine, a governor having driving connection with the engine and operatively connected to the first control valve for regulating the speed of the engine about a predetermined operating speed, flexible coupling means connecting the governor and the second control valve for initiating the closure thereof when the engine exceeds the operating speed by a predetermined speed, timing means operatively connected to the second control valve to prevent the closure thereof before the expiration of a predetermined time interval, retaining means connected to the second control valve for maintaining it in the closed position, and control means connected to the welding circuit and operatively connected to the retaining means for releasing the second control valve for movement to the open position on flow of welding current in the welding circuit.

9. Speed control apparatus for an internal combustion engine comprising, in combination, a first and a second control valve disposed in a fuel inlet pipe to the engine, a governor having driving connection with the engine and means movable in accordance with the speed of the engine, means operatively connecting the speed responsive means to the first control valve to effect the regulation of the flow of fuel through the inlet pipe and thereby the regulation of the speed of the engine to maintain a predetermined operating speed, additional means operatively connecting the speed responsive means to the second control valve to initiate the closure thereof at a predetermined speed of the engine, timing means connected to the additional connecting means to cause the closure of the second control valve at the expiration of a predetermined time interval after the movement thereof is initiated, means connected to the second control valve for maintaining it in the closed position, and load responsive means associated with the last named means for releasing the second control valve for movement to the open position on application of load to the engine.

10. Speed control apparatus for an internal combustion engine comprising, in combination, a first and second control valve disposed in tandem in a fuel inlet pipe to the engine, a governor having driving connection with the engine, a lever on the governor movable in accordance with the speed of the engine, means operatively connecting the lever to the control valves to effect the regulation of the flow of fuel through the inlet pipe and thereby the regulation of the operating speed of the engine, timing means connected to the second control valve and operable to permit the closure thereof at the expiration of a predetermined time interval after the engine is operating at a predetermined speed above the operating speed, means connected to the second control valve for maintaining it in the closed position, and load responsive means operatively disposed with the last named means for releasing the second control valve for movement to the open position on application of load to the engine.

11. Speed control apparatus for an internal combustion engine comprising, in combination, a first and a second control valve disposed in a fuel inlet pipe to the engine, means having driving connection with the engine and operable in accordance with the speed thereof connected to the first control valve for regulating the speed of the engine in a predetermined range of operating speed, coupling means connecting the speed responsive means to the second control valve to effect the closure thereof when the engine exceeds the range of operating speed, timing means operatively connected to the second control valve to prevent the closure thereof before the expiration of a predeterminable time interval, retaining means connected to the second control valve to secure it in the closed position, and means operable in accordance with the operation of the speed responsive means on application of load to the engine for tripping the retaining means to release the second control valve for movement to the open position.

12. Apparatus for controlling the speed of an internal combustion engine connected to drive an electric generator for supplying current to a welding circuit comprising, in combination, a first and a second control valve disposed in tandem in a fuel inlet pipe to the engine, a governor having driving connection with the engine and operatively connected to the first control valve for regulating the speed of the engine in a predetermined range of operating speed, flexible coupling means connecting the governor and the second control valve for initiating the closure thereof when the engine exceeds the range of operating speed, timing means operatively connected to the second control valve to prevent the closure thereof before the expiration of a predeterminable time interval, retaining means connected to the second control valve to secure it in the closed position, and means operable in accordance with the operation of the governor on flow of current in the welding circuit for tripping the retaining means to release the second control valve for movement to the open position.

13. Speed control apparatus for an internal combustion engine comprising, in combination, a first and a second control valve disposed in tandem in a fuel inlet pipe to the engine, a governor having driving connection with the engine and means movable in accordance with the speed of the engine, means operatively connecting the speed responsive means to the first control valve to effect the regulation of the flow of fuel through the inlet pipe and thereby regulate the speed of the engine in a predetermined range of operating speed, flexible coupling means connecting the speed responsive means to the second control valve to initiate the closure thereof when the engine exceeds the range of operating speed, timing means operatively connected to the second control valve to prevent the closure thereof before the expiration of a regulatable time interval, latching means connected to the second control valve for securing it in the closed position, and cam means disposed with the coupling means and in engagement with the latching means for tripping the latching means to release the second control valve for movement to the open position on application of load to the engine.

14. Speed control apparatus for an internal combustion engine comprising, in combination, a first and a second control valve disposed in tandem in a fuel inlet pipe to the engine, a governor having driving connection with the engine and means movable in accordance with the speed of the engine, means operatively connecting the speed responsive means to the first control valve to effect the regulation of the flow of fuel through the inlet pipe and thereby regulate the speed of the engine in a predetermined range of operating speed, resilient means connected to the second control valve for biasing it to the open position, additional resilient means connecting the speed responsive means to the second control valve to initiate the closure thereof when the engine exceeds the range of operating speed, timing means operatively connected to the second control valve to effect the closure thereof at a regulatable rate, latching means disposed to maintain the second control valve in the open position, and tripping means operatively connected to the speed responsive means and disposed in operative relation with the latching means for releasing the second control valve for movement to the open position under the influence of the first named resilient means on application of load to the engine.

15. Apparatus for controlling the speed of an internal combustion engine comprising, in combination, a first and a second control valve disposed in a fuel inlet pipe to the engine, a governor having driving connection with the engine and means movable in accordance with the speed of the engine, means operatively connecting the speed responsive means to the first control valve for regulating the speed of the engine in a predetermined range of operating speed, means for biasing the second control valve to the closed position, means responsive to the application of load to the engine for operating the second control valve to the open position, and timing means operatively connected to the second control valve to prevent the closure thereof before the expiration of a regulatable time interval after the load is removed from the engine.

16. Apparatus for controlling the speed of an internal combustion engine connected to drive an electric generator for supplying current to a welding circuit comprising, in combination, a first and a second control valve disposed in tandem in a fuel inlet pipe to the engine, a governor having driving connection with the engine and operatively connected to the first control valve for regulating the speed of the engine in a predetermined range of operating speed, means for biasing the second control valve to the closed position, electro-responsive means operatively connected to the second control valve and electrically connected to the welding circuit for actuating the second control valve to the open position on flow of current in the welding circuit, and timing means operatively connected to the second control valve to prevent the closure thereof before the expiration of a regulatable time interval after the welding operation is completed.

17. Speed control apparatus for an internal combustion engine connected to drive an electric generator for supplying current to a welding circuit comprising, in combination, a first and a second control valve disposed in a fuel inlet pipe to the engine, a governor having driving connection with the engine and operatively connected to the first control valve for regulating the speed of the engine within a predetermined range of operating speed, control means operatively connected to the second control valve and responsive to termination of the flow of current in the welding circuit for initiating the movement of the second control valve to the closed position, mechanical timing means operatively connected to the second control valve for preventing the closure thereof until the expiration of a predetermined time interval after the termination of flow of current in the welding circuit, and additional control means operatively connected to the second control valve for effecting the movement thereof to the open position substantially instantaneously after the initiation of current flow in the welding circuit.

18. Apparatus for controlling the speed of an internal combustion engine connected to drive an electric generator for supplying current to a welding circuit comprising, in combination, valve means whereby the flow of fuel through a fuel inlet pipe to the engine may be controlled, a governor having driving connection with the engine and operatively connected to the valve means for regulating the speed of the engine about a predetermined operating speed, flexible coupling means also operatively connecting the governor and said valve means for initiating the closure thereof to idling position when the engine exceeds the operating speed by a predetermined speed, timing means operatively connected to said valve means to prevent the closure thereof to idling position before the expiration of a predetermined time interval, retaining means for maintaining said valve means in the idling position, and control means connected to the welding circuit and operatively connected to said retaining means for releasing said valve means for movement to the operating position on flow of current in the welding circuit.

19. Speed control apparatus for an internal combustion engine connected to drive a welding generator for supplying current to a welding circuit comprising, in combination, a pair of throttle valves located in tandem in a fuel inlet pipe to the engine, a governor having driving connection with the engine and operatively connected to one of the control valves for regulating the speed of the engine within a predetermined range of operating speed, control means operatively connected to the other of said control valves and responsive to the termination of flow of current in the welding circuit for initiating the movement of the second control valve to the closed position, timing means disposed to prevent the closure of said other control valve until the expiration of a predetermined time interval after the termination of flow of current in the welding circuit, and additional control means connected to the welding circuit to effect the movement of said other control valve to the open position substantially instantaneously after the initiation of current flow in the welding circuit.

20. Speed control apparatus for an internal combustion engine connected to drive a welding generator for supplying current to a welding circuit comprising, in combination, a pair of throttle valves located in tandem in a fuel inlet pipe to the engine, a governor having driving connection with the engine and operatively connected to one of the control valves for regulating the speed of the engine within a predetermined range of operating speed, means for biasing the other of said control valves to the closed position, means responsive to the application of load to the engine for operating said other control valve to the open position, and timing means operatively connected to said other control valve to prevent the closure thereof before the expiration of a predetermined time interval after the load is removed from the engine.

21. Speed control apparatus for an internal combustion engine connected to drive a welding generator for supplying current to a welding circuit comprising, in combination, a first and a second throttle valve located in tandem in a fuel inlet pipe to the engine, a governor having driving connection with the engine and operatively connected to the first control valve for regulating the speed of the engine within a predetermined range of operating speed, means for biasing the second control valve to the closed position, operating means responsive to the initiation and termination of current flow from said generator for effecting the opening of said second valve on flow of current and permitting the closure thereof on cessation of current flow, and time delay means for preventing the closure of said second valve until after the expiration of a predetermined time interval.

JOHN L. BROWN.
JOHN H. BLANKENBUEHLER.